US011463236B2

(12) United States Patent
do Canto et al.

(10) Patent No.: US 11,463,236 B2
(45) Date of Patent: Oct. 4, 2022

(54) PROGRAMMABLE BLOCK CIPHER WITH MASKED INPUTS

(71) Applicant: CRYPTOGRAPHY RESEARCH, INC., Sunnyvale, CA (US)

(72) Inventors: Rodrigo Portella do Canto, Rotterdam (NL); Elke De Mulder, Kirland, WA (US); Pankaj Rohatgi, Los Altos, CA (US); Matthew Pond Baker, San Francisco, CA (US)

(73) Assignee: CRYPTOGRAPHY RESEARCH, INC., San Jose, CA (US)

( * ) Notice: Subject to any disclaimer, the term of this patent is extended or adjusted under 35 U.S.C. 154(b) by 441 days.

(21) Appl. No.: 16/466,983

(22) PCT Filed: Dec. 4, 2017

(86) PCT No.: PCT/US2017/064434
§ 371 (c)(1),
(2) Date: Jun. 5, 2019

(87) PCT Pub. No.: WO2018/106570
PCT Pub. Date: Jun. 14, 2018

(65) Prior Publication Data
US 2019/0349187 A1 Nov. 14, 2019

Related U.S. Application Data

(60) Provisional application No. 62/432,505, filed on Dec. 9, 2016.

(51) Int. Cl.
*H04L 9/06* (2006.01)
(52) U.S. Cl.
CPC ...... *H04L 9/0637* (2013.01); *H04L 2209/046* (2013.01)

(58) Field of Classification Search
CPC ............... H04L 9/0637; H04L 9/0631; H04L 2209/046; H04L 9/0618; H04L 9/002;
(Continued)

(56) References Cited

U.S. PATENT DOCUMENTS 5,631,960 A * 5/1997 Likens ............... H04L 9/0637
380/2
5,768,390 A * 6/1998 Coppersmith ....... H04L 9/0637
380/42

(Continued)

FOREIGN PATENT DOCUMENTS

TW 201203108 A 1/2012

OTHER PUBLICATIONS

D. Chakraborty and P. Sarkar, "A General Construction of Tweakable Block Ciphers and Different Modes of Operations," in IEEE Transactions on Information Theory, vol. 54, No. 5, pp. 1991-2006, May 2008, doi: 10.1109/TIT.2008.920247.*

(Continued)

*Primary Examiner* — David Garcia Cervetti
(74) *Attorney, Agent, or Firm* — Lowenstein Sandler LLP

(57) ABSTRACT

An indication of a mode of operation to be performed with a block cipher may be received. Logic associated with the block cipher may be configured based on the indicated mode of operation to be performed with the block cipher. Furthermore, an input data and a mask data may be received. The input data may be combined with the mask data to generate a masked input data based on the configured logic. The masked input data may be provided to the block cipher based on the configured logic and an output data may be generated with the block cipher based on the provided masked input data.

20 Claims, 5 Drawing Sheets

(58) Field of Classification Search
CPC ......... H04L 9/065; H04L 9/0643; H04L 9/14; H04L 9/0662; H04L 9/003; H04L 9/06; H04L 2209/24; H04L 2209/125; H04L 2209/04; H04L 2209/08; H04L 9/0625; H04L 2209/12
See application file for complete search history.

(56) References Cited

U.S. PATENT DOCUMENTS

| | | | | |
|---|---|---|---|---|
| 5,835,599 | A * | 11/1998 | Buer | H04L 9/0637 380/37 |
| 6,249,582 | B1 | 6/2001 | Gilley | |
| 6,704,871 | B1 * | 3/2004 | Kaplan | G06F 21/74 713/192 |
| 6,708,273 | B1 * | 3/2004 | Ober | H04L 63/0485 713/192 |
| 6,760,439 | B1 * | 7/2004 | Windirsch | H04L 9/0637 380/37 |
| 7,509,501 | B2 | 3/2009 | Park et al. | |
| 7,606,363 | B1 * | 10/2009 | MacDonald | H04L 9/0618 713/168 |
| 7,657,757 | B2 * | 2/2010 | Feldman | H04L 9/12 713/191 |
| 7,769,168 | B2 * | 8/2010 | Zhu | H04L 9/0637 380/37 |
| 7,885,404 | B2 | 2/2011 | Park | |
| 8,538,012 | B2 | 9/2013 | Dixon et al. | |
| 8,942,374 | B2 * | 1/2015 | Fujisaki | H04L 9/0637 380/28 |
| 9,325,498 | B2 | 4/2016 | Dixon et al. | |
| 10,182,399 | B1 * | 1/2019 | Chu | H04W 52/0229 |
| 2002/0040420 | A1 * | 4/2002 | Yamauchi | G11C 11/4093 711/104 |
| 2002/0040437 | A1 * | 4/2002 | Yamauchi | G11C 7/24 713/193 |
| 2002/0044651 | A1 * | 4/2002 | Tuvell | H04L 9/0637 380/37 |
| 2002/0051534 | A1 * | 5/2002 | Matchett | H04L 9/0625 380/42 |
| 2004/0039908 | A1 * | 2/2004 | Rose | H04L 9/0637 713/168 |
| 2004/0131182 | A1 * | 7/2004 | Rogaway | H04L 9/0637 380/37 |
| 2004/0208072 | A1 * | 10/2004 | Henry | G06F 9/3877 365/203 |
| 2004/0208318 | A1 * | 10/2004 | Henry | G06F 9/30007 380/46 |
| 2004/0223610 | A1 * | 11/2004 | Henry | G06F 9/30007 380/37 |
| 2005/0286720 | A1 * | 12/2005 | Fukuoka | H04L 9/0637 380/255 |
| 2006/0056622 | A1 * | 3/2006 | Liardet | H04L 9/0625 380/28 |
| 2006/0126843 | A1 * | 6/2006 | Brickell | H04L 9/0637 380/260 |
| 2006/0149962 | A1 * | 7/2006 | Fountain | H04L 63/06 713/151 |
| 2007/0098153 | A1 * | 5/2007 | Nishikawa | H04L 9/0631 380/30 |
| 2007/0237332 | A1 | 10/2007 | Lyle | |
| 2007/0263859 | A1 * | 11/2007 | Teglia | H04L 9/003 380/29 |
| 2008/0270793 | A1 * | 10/2008 | Nowottnick | H04L 9/0631 713/168 |
| 2009/0316899 | A1 * | 12/2009 | Kim | H04L 9/0637 380/255 |
| 2011/0255689 | A1 * | 10/2011 | Bolotov | H04L 9/0631 380/42 |
| 2011/0286596 | A1 * | 11/2011 | Gressel | H04L 9/3236 380/268 |
| 2012/0008768 | A1 * | 1/2012 | Mundra | H04L 9/0637 380/28 |
| 2012/0179912 | A1 * | 7/2012 | Sandberg | H04L 9/3242 713/168 |
| 2012/0230492 | A1 * | 9/2012 | Fujisaki | H04L 9/0637 380/277 |
| 2014/0198912 | A1 * | 7/2014 | Mantin | H04L 9/0618 380/28 |
| 2014/0281488 | A1 * | 9/2014 | Jiang | H04L 63/205 713/153 |
| 2015/0113268 | A1 * | 4/2015 | Wu | H04L 9/0631 713/160 |
| 2016/0142746 | A1 * | 5/2016 | Schuberth | H04N 21/236 725/31 |
| 2017/0054550 | A1 * | 2/2017 | Choi | H04L 9/0637 |
| 2017/0061832 | A1 * | 3/2017 | Ghosh | G09C 1/00 |
| 2018/0062830 | A1 * | 3/2018 | Baker | G06F 21/602 |
| 2018/0089467 | A1 * | 3/2018 | Pedersen | H04L 9/0631 |
| 2018/0316491 | A1 * | 11/2018 | Pivovarov | H04L 9/0869 |
| 2019/0363891 | A1 * | 11/2019 | Naito | H04L 9/0869 |
| 2020/0076594 | A1 * | 3/2020 | Audley | G09C 1/00 |
| 2021/0266143 | A1 * | 8/2021 | Boue | H04L 9/0637 |

OTHER PUBLICATIONS

Shai Halevi, An observation regarding Jutla's modes of operation, Apr. 2001, IBM.*

Chakraborty, Debrup et al., "A General Construction of Tweakable Block Ciphers and Different Modes of Operations", IEEE Transactions of Information Theory, vol. 54, No. 5, May 2008, pp. 1991-2006. 16 Pages.

Extended European Search Report dated 3/25/30 re: EP Appln. No. 17877778.5. 8 pages.

Halevi, Shai, "An Observation Regarding Jutla's Modes of Operation", IACR, International Association For Cryptologic Research, vol. 20010515:150429, Apr. 2, 2001, pp. 1-14. 14 pages.

IN First Examination Report dated Aug. 25, 2021 re: IN Appln. No. 201917005378. 7 pages.

Notification Concerning Transmittal of International Preliminary Report on Patentability dated Jun. 20, 2019 re: Int'l Appln. No. PCT/US2017/064434. 6 Pages.

Notification of Transmittal of the International Search Report and the Written Opinion of the International Searching Authority, or the Declaration dated Feb. 7, 2018 re: Int'l Appln. No. PCT/US17/064434. 11 Pages.

EP Communication Pursuant to Article 94(3) EPC dated Dec. 23, 2021 re: EP Appln. No. 17877778.5. 9 pages.

Satoh, A. et al., "A High-Speed Small RSA Encryption LSI With Low Power Dissipation", In: "Computer Vision—ECCV 2020 Workshops: Glasgow, UK, Aug. 23-28, 2020, Proceedings, Part V", Jan. 1, 1998 (Jan. 1, 1998), Springer International Publishing, Cham, XP55873863, ISSN: 0302-9743; ISBN: 978-3-030-68238-5, vol. 1396, pp. 174-187, DOI: 10.1007/BFb0030419, Retrieved from the Internet: URL: https://link.springer.eom/content/pdf.10.1007/BFb0030419.pdf., 14 pages.

EP Response filed on Apr. 26, 2022 in Response to the Official Communication Pursuant to Art. 94(3) EPC dated Dec. 23, 2021 re: EP Appln. No. 17877778.5. 36 pages.

* cited by examiner

PROGRAMMABLE BLOCK CIPHER WITH MASKED INPUTS

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
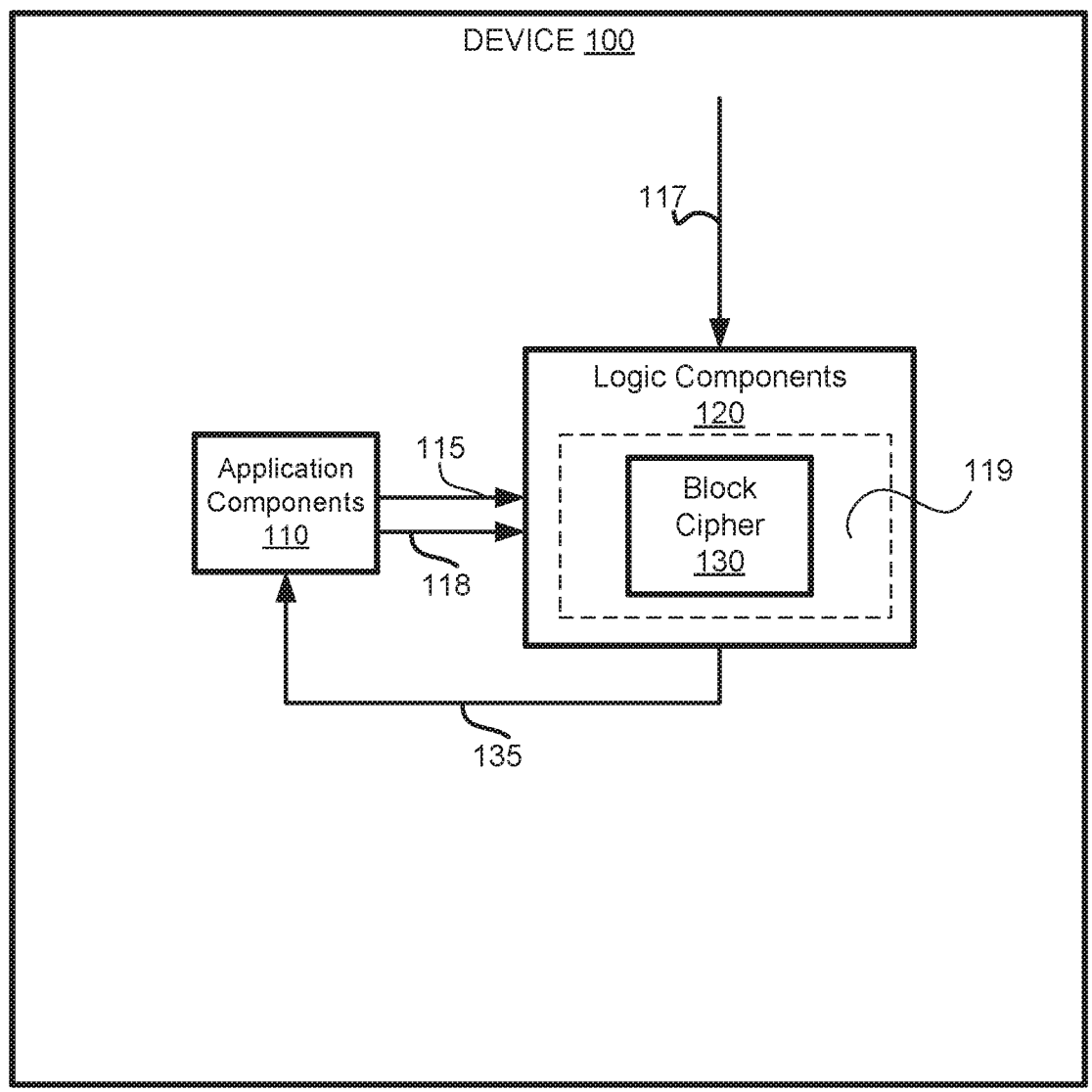
FIG. 1 illustrates an example device including a programmable block cipher with masked inputs in accordance with some embodiments of the present disclosure.

Aspects of the present disclosure are directed to a programmable block cipher with masked inputs, A block cipher may encrypt or decrypt data of a particular size (i.e., a block of data) based on a cryptographic algorithm (e.g., Advanced Encryption Standard (AES), Data Encrypted Standard (DES), Triple DES (TDES), etc.) and a cryptographic key (e.g., a symmetric key). For example, the block cipher may receive a cryptographic key and an input data block and may perform a cryptographic operation with the data block based on the cryptographic key (e.g., encrypt the data block by using the cryptographic key). Thus, the block cipher may perform the cryptographic operation on an input data block of a fixed size.

A mode of operation may refer to a process that uses the block cipher in various applications (e.g., secure payments or secure communication protocols) to encrypt (or decrypt) input data of an arbitrary length by using the single data block cryptographic operation of the block cipher. For example, the mode of operation may use the block cipher that performs cryptographic operations on a data block of a particular size to generate output data blocks of a larger size than the single data blocks of the block cipher if it were to be utilized without the mode of operation. The mode of operation may utilize the cryptographic operation of the cipher block multiple times to generate the output data block of the larger size. For example, a mode of operation may perform a first operation with a first input and store an output of the first operation in a memory register. Subsequently, a second operation may be performed with a second input and the output of the first operation to generate a second output that may be considered the result of the mode of operation.

The applications utilizing the block cipher may use multiple modes of operation. For example, a particular standard (e.g., a National Institute of Standards and Technology (NIST) SP-800-38A specification) may define modes of operations that may each use a block cipher. A particular mode of operation may be specified for a certain application. The different modes of operation may include, but are not limited to, the Electronic Codebook (ECB) mode of operation, the Cipher Block Chaining (CBC) mode of operation, and the Cipher Feedback (CFB) mode of operation.

Aspects of the present disclosure may provide an architecture of a programmable block cipher that may be programmed based on the mode of operation that is to utilize the block cipher. For example, the architecture of a cryptographic component may include the block cipher and logic components (e.g., multiplexers, components to perform an exclusive-or (XOR) Boolean operation, and registers) to receive a signal identifying a particular mode of operation that is to be performed by using the block cipher. Input data may be provided to the block cipher based on the programming of the logic components. Thus, different modes of operation may be performed by utilizing the same block cipher at different times by providing the signal identifying the mode of operation that is to be performed and that is to use the block cipher.

Furthermore, the logic components may mask the input data that is received by the programmable block cipher. The masking of the input data may correspond to combining the received input data with additional data (e.g., random data) to obfuscate or hide the input data. For example, the cryptographic operation of the block cipher may be performed based on the masked input data. Such masking of the input data may prevent a side channel attack from an attacker (e.g., an unauthorized entity). The side channel attack may be a differential power analysis (DPA) attack where the attacker may seek to obtain a secret value or cryptographic key from an integrated circuit including the block cipher by analyzing the power consumption of the integrated circuit as the secret value or cryptographic key is used in a cryptographic operation by the block cipher. The masking of the input data may reduce susceptibility to a DPA attack as random data is used with the input data, thereby reducing a correlation between the power consumption of the integrated circuit and the cryptographic key.

Thus, aspects of the present disclosure may provide advantages of using a single block cipher for performing different modes of operation. The use of the single block cipher may reduce the number of instances of a block cipher that is needed in an integrated circuit to perform the modes of operation and thus reducing the size of the integrated circuit. Furthermore, the masking of the inputs may improve security of a cryptographic key used in the cryptographic operations of the block cipher by reducing susceptibility of the integrated circuit to a DPA attack.

FIG. 1 illustrates an example device 100 including a programmable block cipher with masked inputs. The device 100 may include an integrated circuit with a block cipher and logic components of a programmable block cipher with masked inputs.

As shown in FIG. 1, the device 100 may include application components 110 that may perform functionality corresponding to a particular application (e.g., a mobile payment application, secure communication application, etc.) that may use functionality associated with a cryptographic operation performed by the block cipher 130. For example, the cryptographic operation may be to encrypt and/or decrypt input data 115 received from the application components 110. The input data 115 may be received by the logic components 120 that may mask the input data 115 based on mask data 117 (e.g., random data). For example, a Boolean operation (e.g., an exclusive-or operation) may be performed between the input data 115 and the mask data 117 to generate masked input data. The logic components 120 may further receive a mode of operation signal 118 that may indicate a particular mode of operation that is to be performed with the block cipher 130. The logic components 120 may be configured based on the mode of operation that is to be performed as indicated by the mode of operation signal 118. For example, selection signals for multiplexers (or other such selection units) of the logic components 120 may be generated based on the mode of operation indicated by the signal 118. A Boolean masking operation may be performed based on the selection signals for the multiplexers to generate a masked input signal based on a combination of the mask data 117 and the input data 115. Furthermore, the masked input signal and the mask data may be provided to the block cipher 130 to perform a cryptographic operation with the masked input data that is generated by the logic components 120. Furthermore, the block cipher 130 may update mask data that is received by the logic components 120. The block cipher 130 may generate the output data based on a combination of the mask data and the masked input data. For example, an exclusive-or operation by the logic components 120 between updated mask data and the masked output data from the block cipher 320 may result in the output data 135 that is provided to the application components 110.

The configuring of the logic components 120 with the block cipher 130 may correspond to a mode specific block cipher entity 119. In some embodiments, the mode specific block cipher entity 119 may include a first portion of the logic components 120 and the block cipher 130 so that a second portion of the logic components 120 are not included in the mode specific block cipher entity 119. For example, registers of the logic components 120 may be included in the mode specific block cipher entity 119. The second portion of the logic components 120 that are not included in the mode specific block cipher entity 119 may be XOR logic (e.g., XOR logic 340 and 344 as described in conjunction with FIG. 3). As described in further detail, unmasked data is not stored in a register of the first portion of the logic components 120 that corresponds to the mode specific block cipher entity 130.

Figure 2:
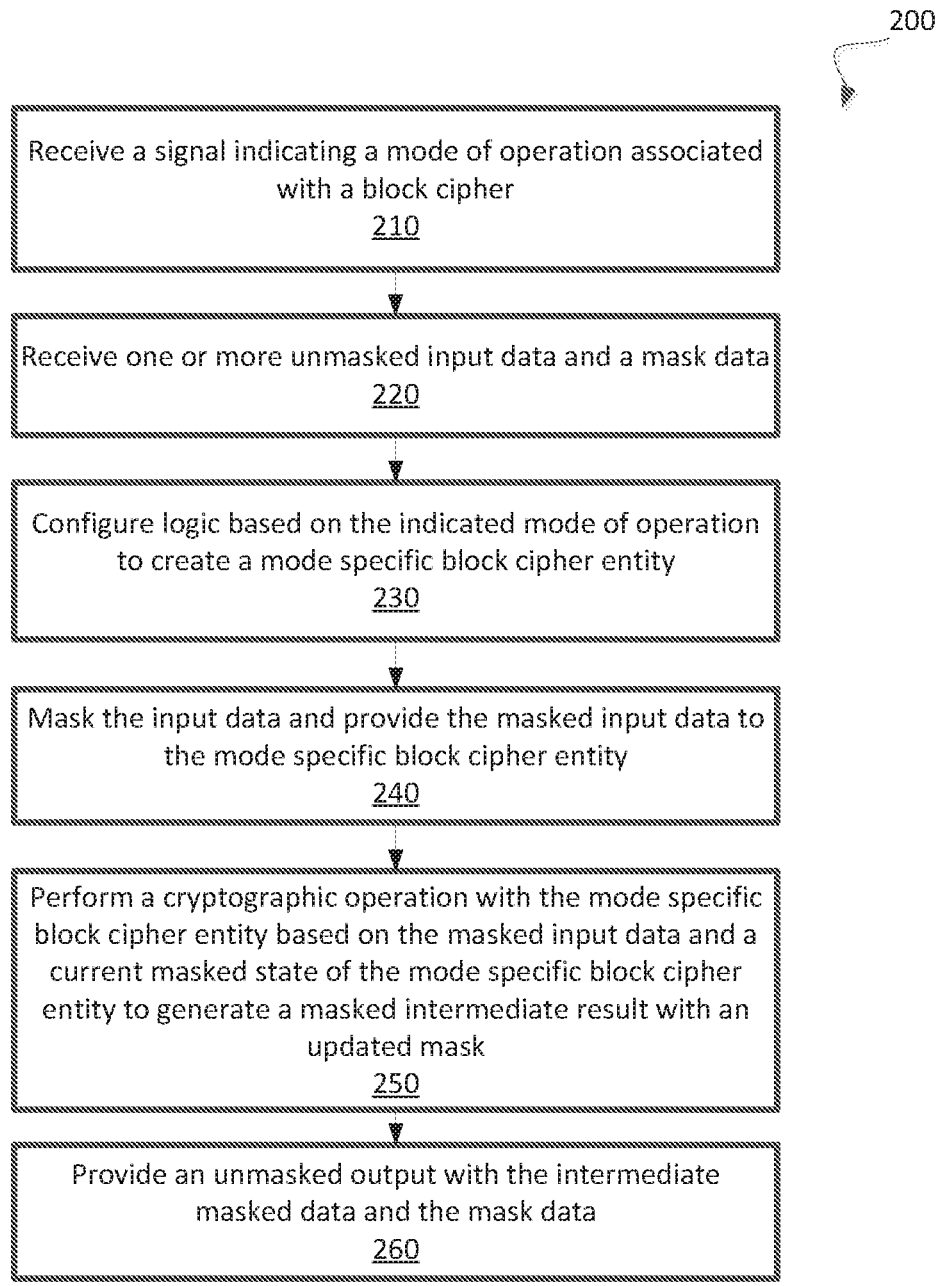
FIG. 2 is a flow diagram of an example method to program a block cipher with masked inputs in accordance with some embodiments.

FIG. 2 is a flow diagram of an example method 200 to program a block cipher. The method 200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 may be performed by the logic components 120 and block cipher 130 of FIG. 1.

As shown in FIG. 2, the method 200 may begin with the processing logic receiving a signal indicating a mode of operation associated with a block cipher (block 210). For example, the mode of operation may be received in response to a request to perform a cryptographic operation that is based on the mode of operation. The request may be received from an application that may use an output of a block cipher to encrypt and/or decrypt data. The processing logic may further receive one or more inputs and mask data (block 220). For example, the mask data, input data such as plaintext, and input data such as an initialization vector (IV) may be received. In some embodiments, a secret cryptographic key that is used to perform the cryptographic operation may be received via a separate input than the plaintext and IV. In an alternative embodiment, the block cipher may contain the secret cryptographic key and may use the included secret cryptographic key to perform the cryptographic operation. The mask data may correspond to random numbers or pseudorandom numbers that are generated by a random or pseudorandom circuit. The plaintext may correspond to data that is to be combined with the mask data. For example, the plaintext may correspond to the data that is to be encrypted. The input data may be a ciphertext when the input data corresponds to the data that is to be decrypted. Furthermore, the initialization vector may correspond to a binary sequence that is different for each cryptographic operation. The initialization vector may be a random non-repeating sequence of binary numbers and may also be unpredictable. The processing logic may further configure logic based on the indicated mode of operation to create a mode specific block cipher entity (block 230). The mode specific block cipher entity may correspond to the block cipher with configured logic. For example, the plaintext may be masked with the mask data. The masking operation of the plaintext with the mask data may be an exclusive-or (XOR) Boolean operation between the plaintext and the mask data to generate masked input data that may be stored in a memory element (e.g., a register). Thus, the input data (e.g., the plaintext) may be masked with the mask data before being stored in a memory element of the logic and provided to the block cipher.

Referring to FIG. 2, the processing logic may further mask the input data and provide the masked input data to the mode specific block cipher entity (block 240). Furthermore, the processing logic may perform a cryptographic operation with the mode specific block cipher entity based on the masked input data and a current masked state of the mode specific block cipher entity to generate a masked intermediate data with an updated mask data (block 250). The mode specific block cipher entity may perform a cryptographic operation with the masked input data and a cryptographic key stored at the block cipher or received as a separate input from the input data to generate the intermediate data (also referred to as the intermediate output data). The cryptographic operation may be to encrypt the masked input data with the cryptographic key or the decrypt the masked input data with the cryptographic key. Furthermore, the mode specific block cipher entity may update the mask data. For example, the mask data may be updated as the masked input data is changed during the cryptographic operation. The changes to the masked input data may correspond to changes to the mask data. Furthermore, the processing logic may provide an unmasked output with the intermediate masked data and the mask data (block 260). Such an output may be provided based on the configured logic. For example, the configured logic may correspond to multiplexers that are used to select the updated mask data and an output of the mode specific block cipher entity and perform an XOR operation between the updated mask data and the output of the mode specific block cipher entity to generate the unmasked output data.

Further details with regard to the operation of the logic and the block cipher and architecture of the logic with the block cipher that is associated with the mode specific block cipher entity are described in further detail below in conjunction with FIGS. 3 and 4.

Figure 3:
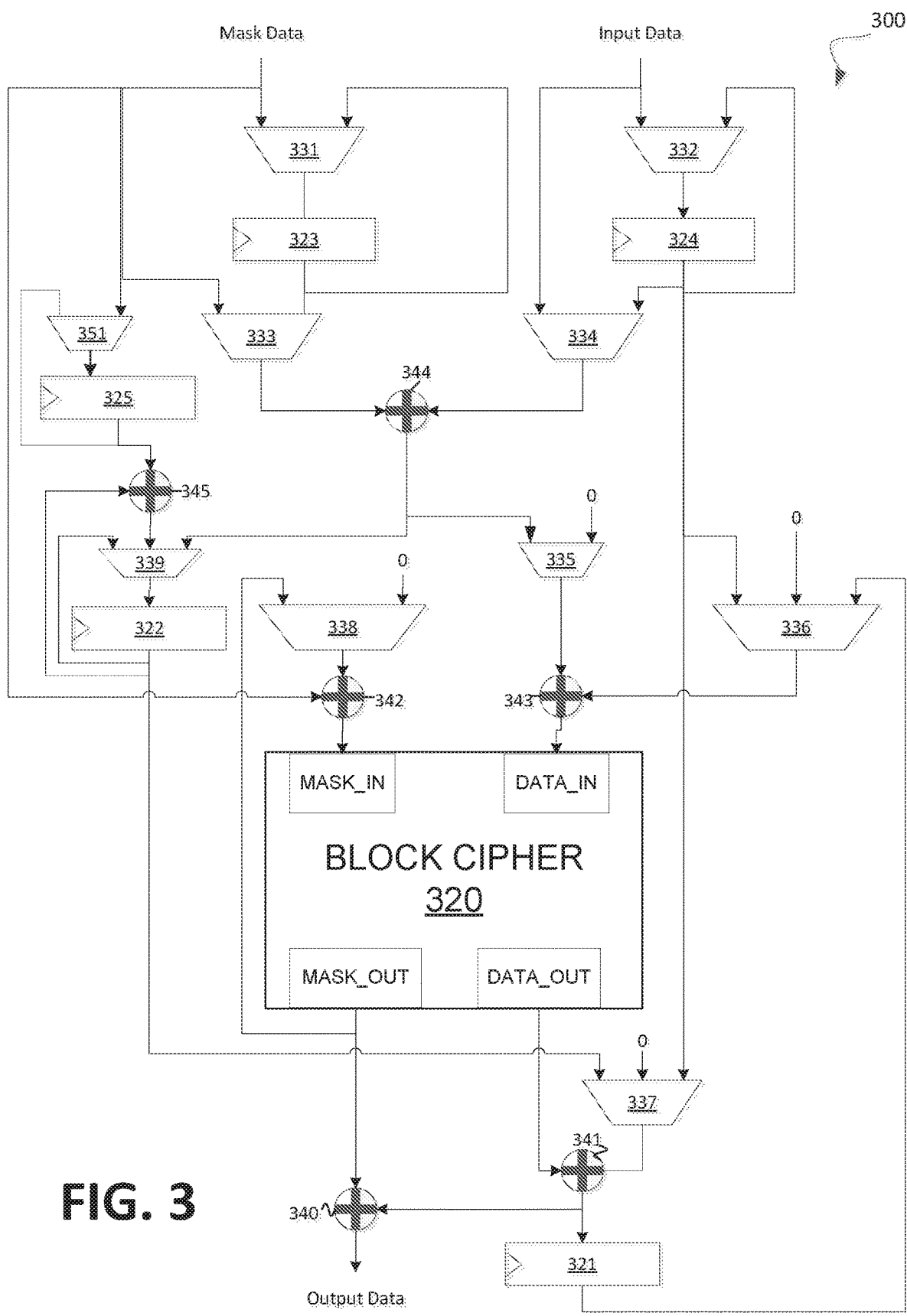
FIG. 3 illustrates a logical representation of an example architecture of a programmable block cipher with Boolean masked inputs in accordance with some embodiments of the present disclosure.

FIG. 3 illustrates a logical representation of an example architecture 300 of a programmable block cipher with Boolean masked inputs. The architecture 300 may correspond to an architecture of the logic components 120 and block cipher 130 of a device 100 as described in conjunction with FIG. 1. In some embodiments, the architecture 300 may correspond to a mode specific block cipher entity when programmed based on a indicated mode of operation.

As shown in FIG. 3, the architecture 300 may include multiplexers 331, 332, 333, 334, 335, 336, 337, 338, and 339, memory elements or registers 321, 322, 323, 324, and 325, Boolean logic components such as XOR logic (e.g., logic gates) 340, 341, 342, 343, 344, and 345, and a block cipher 320. The multiplexers, registers, and XOR logic may correspond to the logic components 120 of FIG. 1 and the block cipher 320 may correspond to the block cipher 130 of FIG. 1.

Referring to FIG. 3, the block cipher 320 may receive various input data based on a mode of operation that is to be performed with the block cipher 320. For example, the input data received by the block cipher 320 may be a value corresponding to or based on data to be encrypted or decrypted, an initialization vector, or a prior output of the block cipher 320. Further details of the types of inputs to the block cipher 320 (e.g., the Data In or input data to the block cipher 320) are described in further detail below. The various multiplexers and XOR logic components may be used to combine two different data. For example, input data corresponding to data that is to be encrypted or decrypted may be combined with mask data by being selected by the multiplexers 333 and 334 and combined via an XOR operation by the XOR logic 344. The register 323 may store mask data and the register 324 may store an initialization vector. Furthermore, the register 321 may store an output of the block cipher 320 and may be provided to the multiplexer 336 so that the output of the block cipher 320 stored at the register 321 may be provided as another input to the block cipher 320. In some embodiments, the output of the block cipher 320 may be selected by the multiplexer 336 to be combined with another value with the XOR logic 343 and the output of the XOR logic 343 may be provided to the block cipher 320 for use in a subsequent operation.

Furthermore, the mask output from the block cipher 320 may be combined with another mask input that is received by the architecture 300. For example, the mask output may be generated by the block cipher 320 and the mask output may be combined with a subsequent mask input that is received by the architecture 300 through the use of the multiplexer 338 and XOR logic 342.

As previously described, logic may be programmed or configured for use with a block cipher to provide different modes of operations. Such modes of operations may include, but are not limited to, ECB, CBC, and CFB, The ECB mode of operation may be a forward cipher operation that is applied to each data block of the plaintext input data or an inverse cipher operation applied to each data block of ciphertext input data. The ECB mode of operation for encryption may be based on the plaintext input data and the cryptographic key used by the block cipher. Thus, the ECB mode of operation may not use a chaining operation where a prior output of the block cipher for a first operation is used as an input or as part of an input for a second operation. For example, to encrypt or decrypt an input data, the ECB mode of operation may perform the cryptographic operation with the block cipher without using an output of the block cipher in a subsequent operation.

In operation, the ECB mode of operation for encryption may correspond to a single type of operation with the block cipher 320. For example, the architecture 300 may receive plaintext input data that is to be encrypted at the multiplexer 334 and mask data at the multiplexer 333. The plaintext input data may be combined with the mask data by the XOR logic 344 to generate a masked plaintext input data that is provided to the block cipher 320. The masked plaintext input data may be provided to the block cipher 320 through the XOR logic 343 that combines the masked plaintext input data with zero values provided by the multiplexer 336. In some embodiments, the use of the zero values with the corresponding XOR logic may effectively disable the XOR logic as the output of the XOR logic may not change the other corresponding input to the XOR Logic. Thus, the zero values may be used as one of the inputs to the XOR logic when the particular XOR logic is not to be used during a particular mode of operation. Furthermore, the mask data may also be provided to the block cipher 320 from the XOR logic 342 that is combined with the zero values provided by the multiplexer 338. The output of the block cipher 320 (e.g., the masked ciphertext) may be saved or stored in the register 321. Furthermore, unmasked ciphertext corresponding to the encrypted input data may be generated by combining the saved output of the block cipher 320 that is stored in the register 321 and from the XOR logic 341 with the mask data output from the block cipher 320 (e.g., the Mask Out) by using the XOR logic 340.

The CBC and CFB modes of operation for encryption and decryption may use the output of the block cipher from a first operation with the input data of a second operation. For example, to encrypt or decrypt an input data block, a first operation may be used and an output of the block cipher may be combined with additional input data for a second operation and the combined data may be provided to the block cipher to generate second output data. The CBC mode of operation for encryption may thus combine the plaintext input data with the previous ciphertext output data of the block cipher. In some embodiments, for a CBC encryption mode of operation, the first operation may perform an XOR operation between a received initialization vector and a plaintext input data and provide the results of the XOR operation as a first input to the block cipher. For the second operation, the output of the block cipher from the first operation may be combined by an XOR operation with a subsequent plaintext input data and the results may be provided to the block cipher as a second input to generate the output for the encryption mode of operation. Thus, for a CBC mode of operation for encryption, the input to the block cipher for the second operation is based on the ciphertext output from the block cipher from the first operation. For the CFB mode of operation for encryption, the ciphertext from the block cipher may be combined with plaintext input data by an XOR operation. For example, for CFB mode of operation for encryption, the first input may be the initialization vector and a portion of the initialization vector may be concatenated with part of the ciphertext output of the block cipher from the prior operation. Further details with regard to the CBC, and CFB modes of operation for encryption using the programmable block cipher with masked inputs are described below.

In operation, the CBC mode of operation for encryption may correspond to multiple operations with the block cipher 320. The multiple operations may include two types of operations. For example, the architecture 300 may receive an initialization vector as an input data and may also receive mask data. The initialization vector may be selected by the multiplexer 332 to be stored in the register 324. The mask data may be selected by the multiplexer 331 to be stored at the register 323. Next, the architecture 300 may receive at the multiplexer 334 plaintext input data that corresponds to the input data that is to be encrypted and may also receive additional mask data at the multiplexer 333. The plaintext input data may be combined with the initialization vector by using the XOR logic 343 to generate the masked plaintext input data which is received by the block cipher 320. Furthermore, the block cipher 320 may receive the mask data from the XOR logic 342 (e.g., based on combining the mask data with the zero values from multiplexer 338 so as not to change the mask data). Subsequently, the block cipher 320 may generate masked ciphertext output data that is stored at the register 321. The masked ciphertext data may be received from the XOR logic 341 and combined with the mask data output (e.g., an updated mask) from the block cipher 320 by using the XOR logic 340 to generate the encrypted plaintext input data or ciphertext. The CBC mode of operation for encryption may further perform subsequent operations with the block cipher 320 as part of the encryption (or decryption) process. For example, the architecture 300 may subsequently receive an additional plaintext input data and additional mask data. The additional plaintext input data may be combined with the additional mask data by the XOR logic 344 to generate an additional masked plaintext input data. The additional masked plaintext input data may also be combined with the output of the previous operation of the block cipher 320. For example, the XOR logic 343 may receive the additional masked plaintext input data and the masked ciphertext data retrieved from the register 321 via the multiplexer 336 to generate another input for the block cipher 320, Furthermore, the block cipher 320 may also receive the mask data output from the block cipher 320 (e.g., through the multiplexer 338 and subjected to an XOR operation with the additional mask data by the XOR logic 342) when the block cipher 320 receives the other input for the block cipher 320 for the second operation.

In operation, the CFB mode of operation may also correspond to multiple operations with the block cipher 320 where the operations may use the block cipher one or more times. In some embodiments, a first input to the block cipher may be provided and another subsequent input to the block cipher may be associated with a feedback loop corresponding to the output of the block cipher. Thus, a mode of operation may use the block cipher multiple times. For example, a first operation and one or more feedback operations may be performed where the first input is associated with the first operation and the feedback loop is associated with the one or more feedback operations after the first operation. The architecture 300 may receive an initialization vector as an input data that is stored at the register 324 and may also receive mask data that is stored at the register 323. Next, the architecture 300 may receive plaintext input data and additional mask data at the multiplexers 333 and 334. The XOR logic 344 may mask the plaintext input data with the additional mask data and store the masked plaintext input data at the register 322. Furthermore, the XOR logic 343 may combine the initialization vector from the register 324 with zero values from the multiplexer 335 (e.g., so as to effectively disable the XOR logic) and the output of the XOR logic 343 may be provided to the block cipher 320. The block cipher 320 may thus generate a masked data output (e.g., an intermediate output) that is combined with the masked plaintext input data from the register 322 by using the multiplexer 337 to select the masked data output and the masked plaintext input data and combine the values with the XOR logic 341 to generate an intermediate value is stored at the register 321. Next, a second type of operation may be performed by the architecture 300 receiving additional plaintext input data and an additional mask data. The mask data output from the block cipher 320 may be received by the block cipher 320 through the XOR logic 342. Furthermore, the intermediate value stored at the register 321 may be provided as an input to the block cipher 320 by the XOR logic 343. Furthermore, the additional plaintext input data may be stored at the register 322 and combined with the mask data output of the block cipher 320 by the XOR logic 341 and the result may be combined with the mask data and the subsequent output of the block cipher 320.

Furthermore, the architecture 300 may save the input data (e.g., the plaintext input data) for the CFB mode of operation for encryption and decryption so that the input data may be combined with an output of the block cipher 320. For example, the input data may be combined with mask data by the XOR logic 345 and selected by the multiplexer 339 to be saved or stored at the register 322. The register 325 may receive and store the mask data. For example, a multiplexer 351 may be used to provide the mask data to the register 325. In some embodiments, the CFB mode of operation may receive the initialization vector, mask data, and plaintext input data in different orders. In a situation where the plaintext input data is received first followed by the mask data, the corresponding masked data (e.g., the masked plaintext input data) may be stored in the register 322 and its corresponding mask data may be stored at the register 325. Afterwards, the initialization vector and additional mask data may be received and stored, respectively, at the registers 324 and 323. The initialization vector and the additional mask data may be received by the block cipher 320 as inputs which may generate an encryption based on the inputs. Subsequently, masked data stored at the register 322 may be used to unmask the masked data stored at the register 322. In some embodiments, the multiplexer 351 may be used to select between the mask data and an output of the register 325. Subsequently, the masked input data may be unmasked by the XOR logic 345 receiving the masked input data stored at the register 322 and the mask data stored at the register 325 and performing an XOR operation between the received inputs. The unmasked input data may then be stored at the register 322 to be received by the multiplexer 337 and combined with the output of the block cipher 320 by the XOR logic 341. Thus, the register 322 may be used to store masked values (e.g., the masked input data) and unmasked values (e.g., the unmasked input data).

Figure 4:
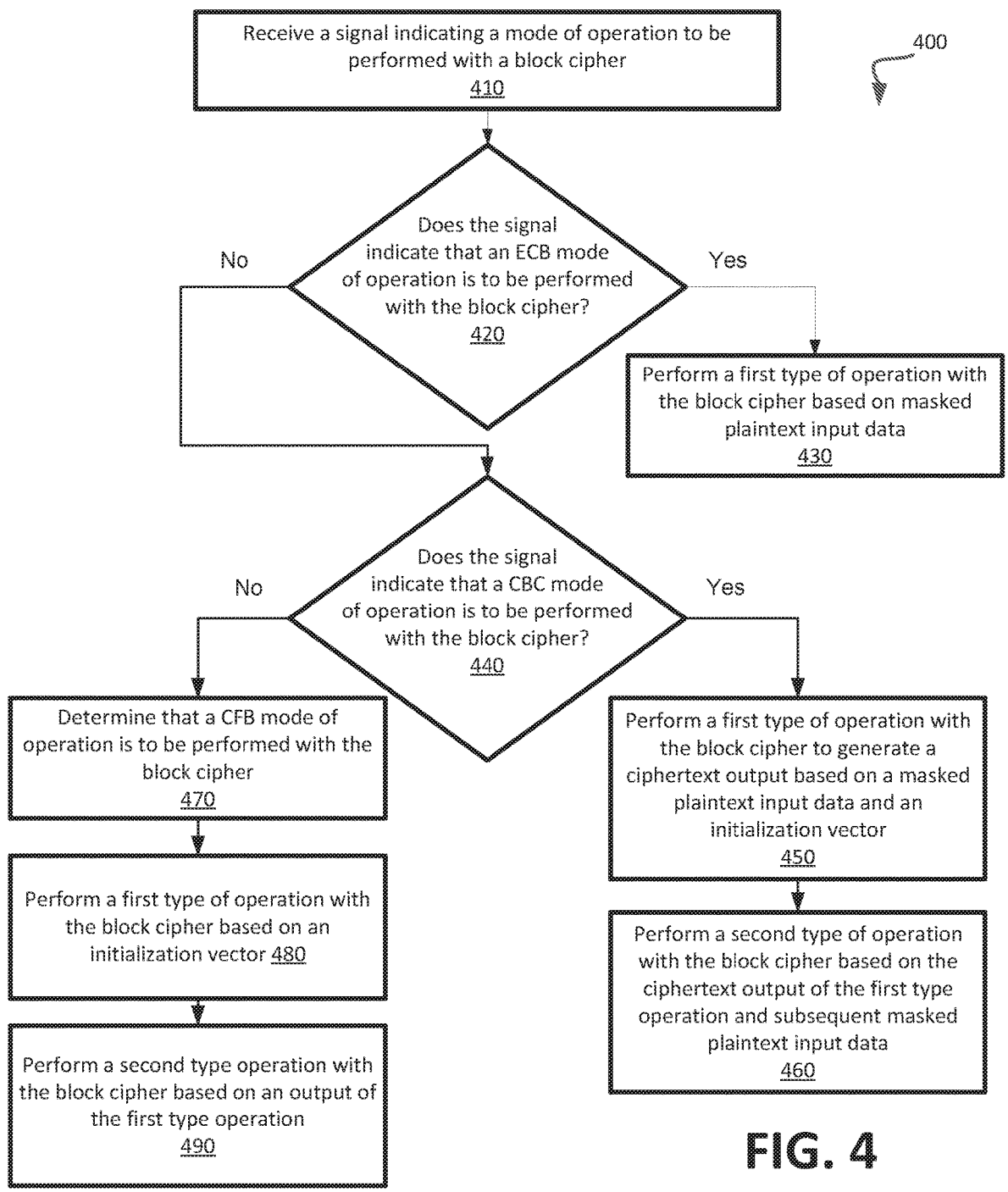
FIG. 4 illustrates a flow diagram of an example method to use a programmable block cipher with masked inputs in accordance with some embodiments of the present disclosure.

FIG. 4 illustrates a flow diagram of an example method 400 to use a programmable block cipher with masked inputs. The method 400 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 may be performed by the logic components 120 and block cipher 130 of FIG. 1.

As shown in FIG. 4, the method 400 may begin with the processing logic receiving a signal indicating a mode of operation to be performed with a block cipher (block 410). The signal may indicate whether an ECB, CFB, or CBC mode of operation is to be performed by using a block cipher. The processing logic may subsequently determine whether the signal indicates that an ECB mode of operation is to be performed with the block cipher (block 420). For example, the signal may indicate to encrypt or decrypt data based on the ECB mode of operation. In response to determining that the signal indicates that the ECB mode of operation for encryption is to be performed with the block cipher, the processing logic may perform a first type of operation with a masked plaintext input data (block 430). For example, selection signals may be provided to multiplexers to perform the first type of operation to perform an XOR operation between mask data and a plaintext input data to generate the masked plaintext input data that is provided to a block cipher. The output of the block cipher may correspond to the encrypted data.

Otherwise, if the processing logic determines that the signal does not indicate that the ECB mode of operation is to be performed with the block cipher, the processing logic may determine whether the signal indicates that a CBC mode of operation is to be performed with the block cipher (block 440). If the signal indicates that the CBC mode of operation is to be performed, then the processing logic may perform a first type of operation to generate a ciphertext output from the block cipher based on masked plaintext input data, mask data, and an initialization vector (block 450). For example, as previously described with regard to FIG. 3, the masked plaintext input data may be combined with the initialization vector by an XOR operation and the result may be provided to the block cipher. Subsequently, the processing logic may perform a second type of operation with the block cipher based on subsequent masked plaintext input data and the ciphertext output of the first operation (block 460). For example, the output of the block cipher from the prior first type of operation (i.e., an intermediate output) may be combined by an XOR operation with the subsequently received masked plaintext input data and provided to the block cipher as an input data. The output of the block cipher after the second type of operation may correspond to the encrypted data. The second type of operation may be continued to be executed or performed until a last data block of the input has been received and processed.

Referring to FIG. 4, if the signal does not indicate that the CBC mode of operation is to be performed, then the processing logic may determine that a CFB mode of operation is to be performed with the block cipher (block 470). The processing logic perform a first type of operation with the block cipher based on an initialization vector (block 480). For example, the block cipher may generate a ciphertext output from a combination of the initialization vector and zero values that are combined with an XOR operation and the ciphertext output of the block cipher may then be combined with plaintext input data with an XOR operation and stored in a register as an intermediate value. Furthermore, the processing logic may configure the logic associated with the block cipher to perform a second type of operation with the block cipher based on the output of the first operation (block 490). For example, the intermediate value corresponding to an output of the first operation that is stored in a register may be subsequently provided as an input to the block cipher to perform the second type of operation.

Figure 5:
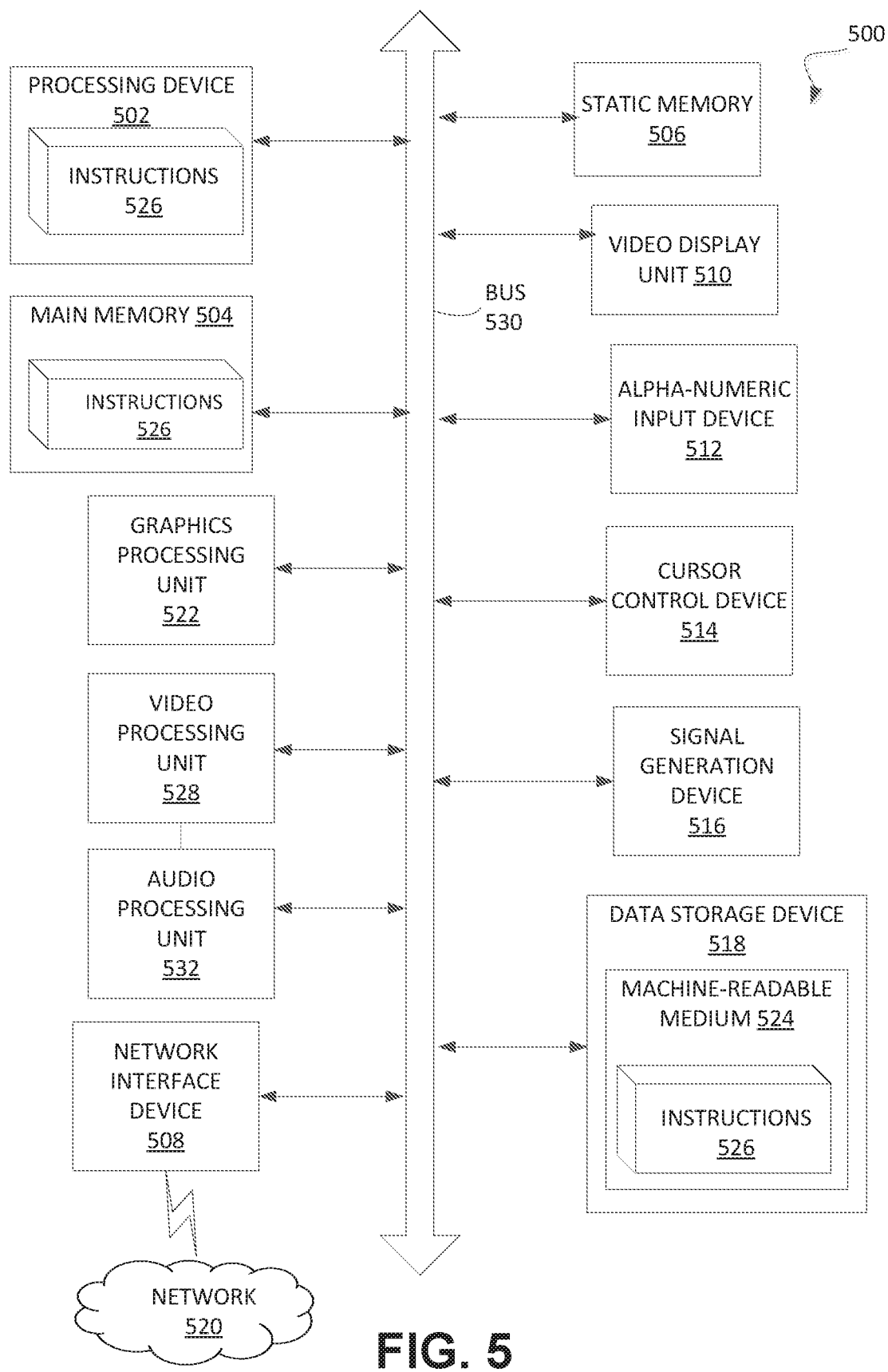
FIG. 5 illustrates a block diagram of an embodiment of a computer system in which some embodiments of the disclosure may operate.

FIG. 5 illustrates an example of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 614 (e.g., a mouse), a graphics processing unit 522, a signal generation device 516 (e.g., a speaker), graphics processing unit 522, video processing unit 528, and audio processing unit 532.

The data storage device 518 may include a machine-readable storage medium 524 (also known as a computer-readable medium) on which is stored one or more sets of instructions or software 526 embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In one implementation, the instructions 526 include instructions to implement functionality as described herein. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
   receiving, by a circuit, a first indication of a first mode of operation to be performed with a block cipher at a first time, wherein the first mode of operation is selected from a plurality of modes of operation;
   configuring, by the circuit, logic associated with the block cipher based on the first mode of operation to be performed with the block cipher at the first time;
   receiving, by the circuit, a second indication of a second mode of operation to be performed with the block cipher at a second time, wherein the second mode of operation is selected from the plurality of modes of operation;
   configuring, by the circuit, the logic based on the second mode of operation to be performed with the block cipher at the second time;
   receiving, by the circuit, an input data and a mask data at the first or second time;
   combining, by the circuit, the input data with the mask data to generate a masked input data, wherein the combining is performed prior to the configuring the logic based on the first mode of operation or the second mode of operation;
   providing, by the circuit, the masked input data and mask data to the block cipher and the configured logic; and
   generating an output data with the block cipher, the configured logic, and the mask data based on the provided masked input data, wherein the first mode of operation and second mode of operation are different modes of operation of the plurality of modes of operation.

2. The method of claim 1, wherein generating the output data with the block cipher, the configured logic, and the mask data based on the provided masked input data comprises:
   in response to the mode of operation corresponding to a plurality of operations using the block cipher, performing a first operation of the plurality of operations by using the block cipher to generate an intermediate output data and performing a second operation of the plurality of operations using the block cipher by providing a combination of the intermediate output data with additional input data to generate the output data.

3. The method of claim 2, wherein the combination of the intermediate output data with the additional input data is associated with an exclusive-or (XOR) operation between the intermediate output data and the additional input data.

4. The method of claim 1, wherein the indicated mode of operation corresponds to an Electronic Codebook (ECB) mode of operation, a Cipher Block Chaining (CBC) mode of operation, or a Cipher Feedback (CFB) mode of operation, and wherein the same block cipher is used to perform each of the ECB, CBC, and CFB modes of operation based on the configured logic.

5. The method of claim 1, further comprising:
   providing the mask data to the block cipher to update the mask data based on use of the block cipher; and
   combining the output data with the updated mask data to generate a second output data.

6. The method of claim 1, wherein the logic comprises multiplexers, registers, and Boolean logic corresponding to an exclusive-or (XOR) operation.

7. The method of claim 1, wherein the mode of operation is associated with an encryption of the input data by using the block cipher or a decryption of the input data by using the block cipher.

8. A system comprising:
a memory, and
a processing device, operatively coupled with the memory, to:
receive a first indication of a first mode of operation to be performed with a block cipher at a first time, wherein the first mode of operation is selected from a plurality of modes of operation;
configure logic associated with the block cipher based on the indicated first mode of operation to be performed with the block cipher at the first time;
receive a second indication of a second mode of operation to be performed with a block cipher at a second time, wherein the second mode of operation is selected from the plurality of modes of operation and is different from the first mode of operation;
configure the logic based on the second mode of operation to be performed with the block cipher at the second time;
receive an input data and a mask data at the first or second time;
combine the input data with the mask data to generate a masked input data, wherein the combining is performed prior to the configuring the logic based on the first mode of operation or the second mode of operation;
provide the masked input data and mask data to the block cipher and the configured logic; and
generate an output data with the block cipher, the configured logic, and the mask data based on the provided masked input data.

9. The system of claim 8, wherein to generate the output data with the block cipher, the configured logic, and the mask data based on the provided masked input data, the processing device is further to:
in response to the mode of operation corresponding to a plurality of operations using the block cipher, perform a first operation of the plurality of operations by using the block cipher to generate an intermediate output data and performing a second operation of the plurality of operations using the block cipher by providing a combination of the intermediate output data with additional input data to generate the output data.

10. The system of claim 9, wherein the combination of the intermediate output data with the additional input data is associated with an exclusive-or (XOR) operation between the intermediate output data and the additional input data.

11. The system of claim 8, wherein the indicated mode of operation corresponds to an
Electronic Codebook (ECB) mode of operation, a Cipher Block Chaining (CBC) mode of operation, or a Cipher Feedback (CFB) mode of operation, and wherein the same block cipher is used to perform each of the ECB, CBC, and CFB modes of operation based on the configured logic.

12. The system of claim 8, wherein the processing device is further to:
provide the mask data to the block cipher to update the mask data based on use of the block cipher; and
combine the output data with the updated mask data to generate a second output data.

13. The system of claim 8, wherein the logic comprises multiplexers, registers, and Boolean logic corresponding to an exclusive-or (XOR) operation.

14. The system of claim 8, wherein the mode of operation is associated with an encryption of the input data by using the block cipher or a decryption of the input data by using the block cipher.

15. A non-transitory computer readable medium comprising instructions that, when executed by a processing device, cause the processing device to perform operations comprising:
receiving, by a circuit of the processing device, a first indication of a first mode of operation to be performed with a block cipher at a first time, wherein the first mode of operation is selected from a plurality of modes of operation;
configuring, by the circuit, logic associated with the block cipher based on the first mode of operation to be performed with the block cipher at the first time;
receiving, by the circuit, a second indication of a second mode of operation to be performed with the block cipher at a second time, wherein the second mode of operation is selected from the plurality of modes of operation;
configuring, by the circuit, the logic based on the second mode of operation to be performed with the block cipher at the second time;
receiving, by the circuit, an input data and a mask data at the first or second time;
combining, by the circuit, the input data with the mask data to generate a masked input data, wherein the combining is performed prior to the configuring the logic based on the first mode of operation or the second mode of operation;
providing, by the circuit, the masked input data and mask data to the block cipher and the configured logic; and
generating an output data with the block cipher, the configured logic, and the mask data based on the provided masked input data, wherein the first mode of operation and second mode of operation are different modes of operation of the plurality of modes of operation.

16. The non-transitory computer readable medium of claim 15, wherein to generate the output data with the block cipher, the configured logic, and the mask data based on the provided masked input data, the operations further comprise:
in response to the mode of operation corresponding to a plurality of operations using the block cipher, performing a first operation of the plurality of operations by using the block cipher to generate an intermediate output data and performing a second operation of the plurality of operations using the block cipher by providing a combination of the intermediate output data with additional input data to generate the output data.

17. The non-transitory computer readable medium of claim 16, wherein the combination of the intermediate output data with the additional input data is associated with an exclusive-or (XOR) operation between the intermediate output data and the additional input data.

18. The non-transitory computer readable medium of claim 15, wherein the indicated mode of operation corresponds to an Electronic Codebook (ECB) mode of operation, a Cipher Block Chaining (CBC) mode of operation, or a Cipher Feedback (CFB) mode of operation, and wherein the same block cipher is used to perform each of the ECB, CBC, and CFB modes of operation based on the configured logic.

19. The non-transitory computer readable medium of claim 15, the operations further comprising:
   providing the mask data to the block cipher to update the mask data based on use of the block cipher; and
   combining the output data with the updated mask data to generate a second output data.

20. The non-transitory computer readable medium of claim 15, wherein the mode of operation is associated with an encryption of the input data by using the block cipher or a decryption of the input data by using the block cipher.

* * * * *